United States Patent [19]

Jung et al.

[11] 4,237,605
[45] Dec. 9, 1980

[54] MACHINE FOR ASSEMBLING SCREW BLANKS AND WASHERS

[75] Inventors: Clemens Jung, Hilchenbach; Ernst Wiesel, Hilchenbach-Lutzel, both of Fed. Rep. of Germany

[73] Assignee: E. W. Menn KG Maschinenfabrik, Hilchenbach, Fed. Rep. of Germany

[21] Appl. No.: 16,741

[22] Filed: Mar. 2, 1979

[30] Foreign Application Priority Data

Mar. 11, 1978 [DE] Fed. Rep. of Germany ....... 2810620

[51] Int. Cl.³ ............................................. B23P 19/08
[52] U.S. Cl. ................................. 29/783; 10/155 A; 29/785; 29/786
[58] Field of Search ............ 10/155 R, 155 A, 162 A, 10/165, 169; 29/771, 783, 785, 786, 791, 792

[56] References Cited

U.S. PATENT DOCUMENTS

| | | | |
|---|---|---|---|
| 2,914,781 | 12/1959 | Prutton | 10/155 A |
| 3,100,307 | 8/1963 | Hatherell et al. | 10/155 A |
| 3,225,370 | 12/1965 | Pipes | 10/155 A |
| 3,226,744 | 1/1966 | Marechal et al. | 10/155 A |
| 3,523,316 | 8/1970 | Alexander | 10/155 A |
| 3,750,206 | 8/1973 | Pomernacki | 10/155 A |
| 4,058,866 | 11/1977 | Foster | 10/155 A |

FOREIGN PATENT DOCUMENTS

723811  2/1955  United Kingdom ................. 10/155 A

*Primary Examiner*—Ervin M. Combs

*Attorney, Agent, or Firm*—Young & Thompson

[57] ABSTRACT

A machine for assembling washers on headed screw blanks, comprises a turntable having peripheral recesses into which the washers are inserted. Elevators in the form of vertically swinging arms are mounted on the turntable about the periphery thereof, extending generally radially of the turntable, and are cam controlled to swing vertically relative to the turntable. In their upwardly swung position, recesses in the outer ends of the arms receive screw blanks beneath the heads thereof, the arms then swinging downwardly to insert the screw blanks in the washers that are in alignment below the screw blanks on the turntable. At the discharge side of the turntable, a slideway is provided for complete assemblies; but incomplete assemblies are detected and are disassembled with the parts returned to storage. Incomplete assemblies are diverted along a pair of spaced horizontal rails that extend tangentially of the turntable and have opposed grooves that receive the washers, the heads of the screws riding on the upper surfaces of these rails. The slideway for the complete assemblies is horizontally swingable, under control of a detector of incomplete assemblies, into vertical registry over the pair of rails, whereupon the incomplete assembly is dropped from the slideway onto the rails, the rail grooves terminating sooner than the upper surfaces of the rails, so that the washers drop off the incomplete assemblies before the screw blanks drop from the rails, thereby to separate the washers from the screw blanks of the incomplete assemblies.

4 Claims, 5 Drawing Figures

MACHINE FOR ASSEMBLING SCREW BLANKS AND WASHERS

The invention relates to machines for the assembling of screw blanks and washer elements with a turntable arranged obliquely with respect to the horizontal to accommodate the screw blanks and washers in peripheral cutouts, furthermore with feeding devices to place the washers and screw blanks in the peripheral cutouts of the turntable, with a device for the coaxial insertion of the screw blanks in the washers, with a discharge means for the completed screw blank and washer combinations, as well as with a device for the removal of defective combinations.

Such a machine has been known, for example, from DOS [German Unexamined Laid-Open Application] 1,527,590. In this conventional machine, the screw blanks are lowered with their heads via a fixedly arranged, inclined curved section into the washers while being entrained in corresponding edge cutouts of the turntable along a circular arc. The guidance of the heads of the screw blanks on the edge cutouts of the moving turntable, on the one hand, and on the fixed curved path, on the other hand, apparently results in an inaccurate alignment of the screw blank shanks with respect to the bores of the washer or washers and thus in rather frequent disturbances in the functional operation of the machine. Besides, the changeover of the machine to different dimensions of the screw blanks and washers is relatively cumbersome, since very many parts must be exchanged, which is time-consuming. A similar apparatus, operating approximately in accordance with the same principle, is also disclosed in DOS 2,120,150.

In an assembly apparatus for screw blanks and washers known from DOS 2,623,924, a turret with clamping heads distributed along the circumference is provided in addition to a turntable, these clamping heads retaining the screw blank heads which latter are inserted, by a cam-controlled lowering of the respective clamping head, with their shanks into the bores of a washer or shim at a place where the turret and the turntable meet on a common tangent or chord. The turntable and the turret are driven by way of a gear belt drive mechanism common to both of them. There are doubts also in this machine whether an exact alignment of the screw blanks and washers is attained in all cases prior to assembly, so that the functional safety leaves much to be desired.

This lack in functional safety also exists in machines wherein the shanks of the screw blanks and the washers are made to meet in a relative inclined position. Such a machine is known, for example, from U.S. Pat. No. 3,568,229 wherein the parts to be assembled are moved toward each other from storage drums by way of inclined rails. The relative inclined position of the parts with respect to each other requires perforce an alignment within even narrower tolerances, and once a screw shank has engaged a washer in its bore, the shank is subjected, during the entrainment of the washer, to a tilting force so that a secure dropping of the shank into the bore of the washer is not always ensured.

These difficulties are also to be expected in a machine as known from U.S. Pat. No. 3,654,650. In all machines wherein the parts to be combined are joined while they are in an inclined position relatively to each other, it is impossible to introduce a screw blank simultaneously into two washers, and the machines are entirely unsuitable for the joining of screw blanks and spring washers or lock washers, since the latter are usually curved and thus cannot offer a constant point of attack to the shank of the screw blank.

The principle of an inclined joining is also described in U.S. Pat. No. 3,745,599. This conventional device likewise suffers from the same deficiencies as described in connection with the machine in DOS 1,810,203 or that of DOS 2,340,277, wherein the washers are entrained from a magazinized stack of washers by the shank of the obliquely conveyed screw blank.

The invention is based on the object of improving a machine of the type described hereinabove with respect to its operating safety and efficiency, broadening its usability spectrum, essentially reducing the number of worn parts, and simplifying the changeover of the machine.

This object has been attained by the features set forth in the characterizing portion of claim 1.

Due to the substantially increased operating safety of the machine according to this invention, the operating speed of this machine can likewise be raised, so that the machine corresponds extensively to the operating capacity of an automatic thread rolling apparatus connected thereafter. Such an automatic thread rolling apparatus connected after the machine takes care, by the noncutting shaping of the threads, as a final step, of providing an undetachable connection between screws and washers. Instead of a thread rolling automat, it is also possible to adjoin a different apparatus which prepares the shank of a bolt so that the attached washer or the like is retained and cannot be lost.

The machine of this invention is suitable for the manufacture of combinations according to DIN [German Industrial Standard] 6900 and others. Disturbances in the operation are very rare and, if they should occur from time to time, e.g. by defective parts to be combined, then the machine functions can be monitored so perfectly that, in case of any danger of damage to the machine, the latter is first automatically shut off and/or arrested by way of a slipping clutch. Furthermore the parts of a faulty combination are automatically separated so that these parts can be returned to the corresponding storage bins and feed devices.

Additional features of the invention can be seen from the dependent claims and from the following description of an embodiment illustrated in the drawings wherein:

Figure 3:
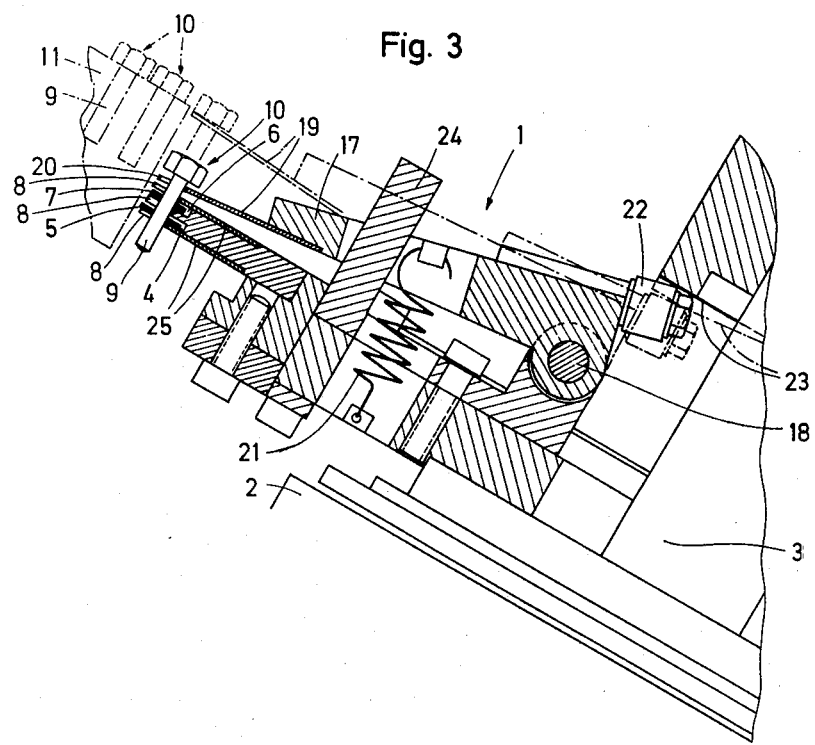
FIG. 3 is a section through a part of the machine according to FIG. 1, wherein the section plane of the arrangement shown in solid lines extends along line III—III and the arrangement indicated in dot-dash lines extends along line III'—III' in FIG. 1.

The illustrated machine comprises a turntable 1 driven by a motor, this turntable being rotatably supported on a pivot 3 arranged fixedly and inclined toward the vertical in a machine frame 2 (FIG. 3). The turntable 1 has peripheral cutouts 4 (FIG. 3) to receive a planer perforated shim 5, peripheral cutouts 6 to receive, for example, spring washers 7, and cutouts 8 to receive, support, and center the shanks 9 of screw blanks 10. The cutouts 4, 6, and 8 are disposed concentrically one above the other.

The screw blanks 10 are fed via a slide rail 11 from a storage bin, not shown, to the outer periphery of the turntable 1, while the washers are fed, in the form of planar perforated shims 5, by way of a slide rail 12. The spring washers 7 (as illustrated) or different washers are suitably introduced under air pressure from a storage bin 13 with the aid of a rotating spacer disk 14 by means of a synchronized air nozzle (not shown) into the peripheral cutouts 6 of the turntable 1, the washers moving along an arcuate guide duct 15. The spacer disk 14 has flat recesses 16 at its circumference to receive respectively one washer 7. The storage bin 13 is arranged in an inclined position so that the washers 7 always accumulate in the lower portion of the storage bin 13. The spacer disk 14 has additional flat recesses on its rear side for washers of different dimensions and is fashioned so that it can be turned over and thus utilized for two differing types of washers.

Elevating segments 17 are arranged on the turntable 1 in a ray-shaped pattern and are pivotably mounted about axes 18 extending in the chordal direction toward the turntable 1. In the illustrated embodiment, twelve elevating segments 17 are provided in total, three of which are illustrated. These segments have, along their outer periphery, exchangeable annular segments 19 with peripheral cutouts 20 to receive the shanks 9 of the screw blanks 10. A spring 21 pulls the elevating segments 17 downwardly, whereas rollers 22 cooperate with a control cam 23 which controls the stroke of the annular segments 19. Guide blocks 24 serve for the additional guidance of the elevating segments 17. The control cam 23 is mounted so that it is vertically adjustable to the fixed pivot pin 3, so that the cam can be adjusted to the respective shank length of the screw blank 10.

The peripheral cutouts 8 of the turntable 1 are likewise provided in exchangeable annular segments 25 attached to the turntable 1.

Figure 1:
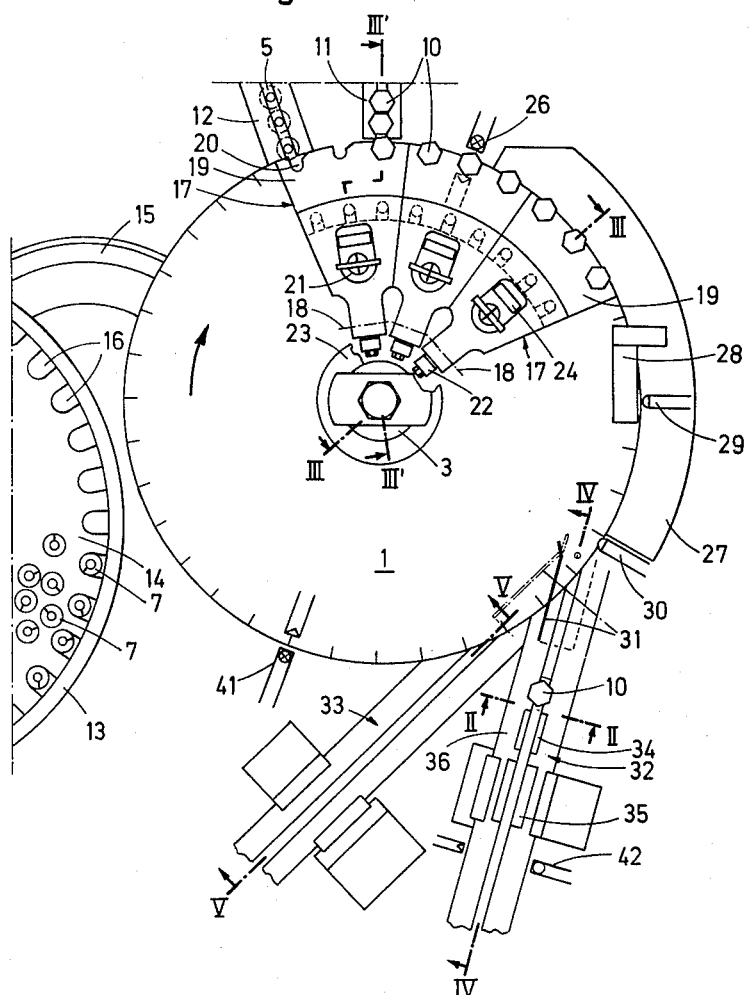
FIG. 1 shows a schematic top view of a machine according to this invention.
Figure 2:
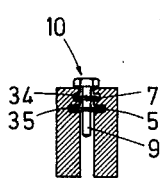
FIG. 2 is a section along line II—II in FIG. 1.

The control cam 23 is arranged and adjusted in such a way that, prior to reaching the slide rail 11 for the screw blanks 10, the elevating segments 17 are lifted in succession gradually to the required level in order to receive in their peripheral cutouts 20 respectively one screw blank 10 (dot-dash lined position in FIG. 3). After the last peripheral cutout 20 of the respective elevating segment 17 has entrained its screw blank, and a light barrier 26 has examined the presence of screw blanks 10 in all peripheral cutouts 8, 20, the elevating segments 17 with the screw blanks 10 are lowered, which has been accomplished approximately at the level of the section line III—III in FIG. 1 (see the position drawn in solid lines in FIG. 3), so that the shanks 9 are lowered into the washer elements 5, 7 previously already provided in the cutouts 4, 6 of the turntable 1.

To prevent the washers 5, 7 and the screw blanks 10 from sliding out of the peripheral cutouts 4, 6, 8, 20, an arcuate guide means 27 is provided. A scanning plate 28, which scans the heads of the screw blanks 10, is arranged on this guide means in a spring-resilient fashion.

If a screw blank 10 should be jammed, for example due to a damaged shank 9, then the scanning plate 28 is lifted and a switch 29 is activated thereby, the latter shutting off the machine before the jammed screw blank 10 can cause damage along its further path. The machine is also turned off if the light barrier 26 has detected a missing screw blank 10, so that the latter can be subsequently inserted by hand. The respective kind of defect is indicated at an operating and switching panel (not shown).

The combination is examined, by means of additional switches 30, to detect whether all of the necessary washers 5 and/or 7 are present. The switches 30 actuate a routing means 31. If the combination is complete, the routing means 31 is in the position shown schematically in solid lines, whereas the routing means 31 is moved into the position shown in dot-dash lines if a washer 5 or 7 is missing. The complete combination is transferred at the routing means 31 to a slide rail 32 (see also FIG. 4), leading to a machine working on the shank 9 of the screw blank 10, for example a thread rolling automat.

Figure 5:
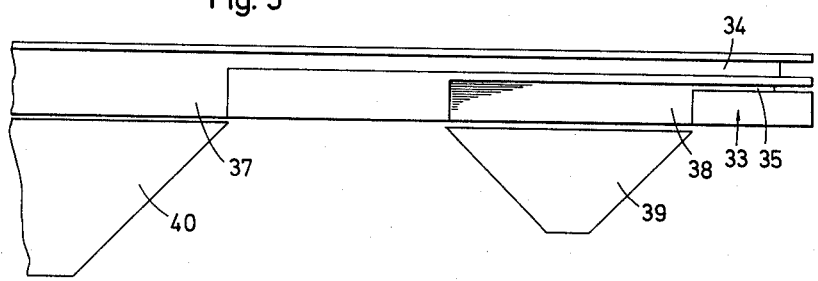
FIG. 5 is a section along line V—V in FIG. 1.

A defective combination is taken over, due to the switched-over routing means 31, by another slide rail 33, which latter is indicated in detail in FIG. 5 and is constructed so that it separates all parts of the flawed combination, i.e. the screw blank 10 and a washer 5 or 7, if two washers are desired, and allows the parts to fall into separate containers so that they can be returned to the respective storage bins. The machine thus is not turned off by the switches 30 if the latter detect an error.

Figure 4:
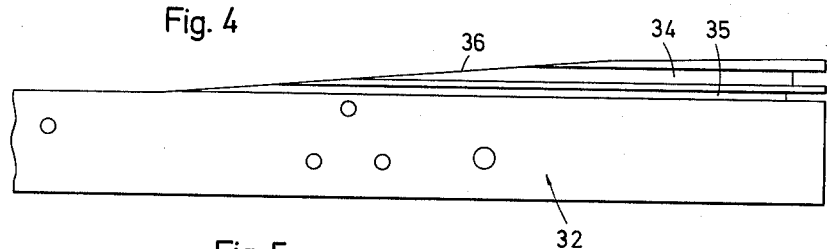
FIG. 4 shows a section along line IV—IV in FIG. 1.

The slide rails 32, 33 are shown in FIGS. 4 and 5, namely in each case one-half thereof, wherein the other half is constructed in mirror-image symmetry and is arranged at a spacing from the first-mentioned half corresponding to the diameter of shank 9. Both slide rails 32, 33 include appropriate guide grooves 34, 35 for the washers 7, 5. In the guide rail 32 (FIG. 4), the grooves 34, 35 terminate in succession into the upper surface 36 of the slide rail 32, which surface is oriented obliquely downwardly and supports the heads of the screw blanks 10. In the guide rail 33 for flawed combinations, the guide grooves 34, 35 terminate into corresponding discharge ducts 37, 38 for the washers 7 and 5, respectively, whereas the screw blanks 10, which carried defective parts, drop at the end of the guide rail 33 into a collecting bin (not shown).

In the illustrated embodiment, respectively one screw blank 10 is provided, for example, with a spring washer 7 and with a planar washer or shim 5. When separating a defective combination, the washer or shim 5 then drops through the discharge duct 38, via a schematically indicated funnel 39, into a collecting bin, not shown, if, in this intended combination, the required spring washer 7 is missing. If a screw blank 10 is only studded with a spring washer 7, while the washer 5 is missing, then the washer 7 drops via the discharge duct 37, by way of a schematically illustrated funnel 40, into a collecting bin, not shown, provided for this purpose. Also, in case both washers 5, 7 are missing, the unstudded screw blank 10 slides, at the end of the slide rail 33, into the collecting bin intended for this purpose.

Of course, the machine can also be utilized for providing screw blanks with only one washer. The respective switch for controlling the washer which is not required is then deactivated.

The scanning elements 26, 29, 30 are controlled by a light barrier 41 serving as the synchronizing means, so that the control operations are always conducted at the correct location and at the correct instant. The light barrier 41 furthermore controls the feeding device for the spring washers 7. A valve associated with the air nozzle of this device can be controlled by the synchronizing means (light barrier 41).

A safety means against jamming in the form of a light barrier 42 or some other scanning element is arranged at the slide rail 32 for the removal of the screw blanks 10 properly studded with the desired washer elements 5, 7. This jamming safety means prevents an accumulation of the combined parts in front of the thread rolling automat or the like.

What is claimed is:

1. In a machine for assembling screw or bolt blanks and associated parts, comprising a rotary platform inclined obliquely to the horizontal for receiving the blanks and associated parts in peripheral recesses, supplying means for inserting the associated parts and the screw or bolt blanks into the peripheral recesses of the rotary plate, means for coaxially inserting the screw or bolt blanks into their associated parts, removal means for the completed combinations of screw or bolt blanks and associated parts, and means for removing defective combinations; the improvement in which the means for the coaxial insertion of the screw or bolt blanks into the associated parts has a plurality of lifting segments which rotate with the rotary platform, means pivotally mounting said segments to pivot about axes extending in chordal directions of the rotary platform, recesses at the peripheries of said segments for receiving the shafts of the screw or bolt blanks, a slide rail that extends substantially radially relative to the rotary platform, a cam that engages the inner ends of said segments to swing them about said pivotal mounting means whereby said peripheries are raised adjacent said slide rail and are lowered when the rotary platform is further rotated, said removal means for the completed screw or bolt blank and associated part combinations comprising two parallel slide rails which have grooves in the lateral faces which face one another, said grooves forming a tangential continuation of the peripheral recesses of the rotary platform which guide the associated parts and end successively in the upper faces of the slide rails bearing the heads of the screw or bolt blanks, said means removing defective combinations comprising two parallel side rails with grooves, which also form tangential continuations of the peripheral recesses of the rotary platform which receive the associated parts and which open out successively into vacant discharge channels of the slide rails, scanning means to detect the presence or absence of said blanks and associated parts in said recesses, and a deflector actuated by said scanning means at the transition point between the rotary platform and the slide rails to deflect the contents of said recesses to predetermined said slide rails according to said presence or absence.

2. A machine according to claim 1, the peripheral recesses of the lifting segments being disposed in groups in ring segments which are detachably secured to the lifting segments, the peripheral recesses of the rotary platform being disposed in groups in interchangeable ring segments.

3. A machine according to claim 1, and, viewed in the direction of travel of the rotary platform, impulse means in front of the supplying means for the associated parts and screw or bolt blanks; and, arranged successively behind the supplying means, an electronic scanning element for monitoring the presence of a screw or bolt blank in each peripheral recess, a scanning element for monitoring the correct depth of insertion of the screw or bolt blank, and a further scanning element for monitoring the presence of the associated part or parts.

4. A machine according to claim 1, and separate collecting vessels for receiving the separated singled and sorted parts of the defective combinations, said vessels being disposed below the discharge channels of the means for removing defective combinations.

* * * * *